United States Patent [19]

Morimoto

[11] Patent Number: 5,275,353
[45] Date of Patent: Jan. 4, 1994

[54] FISHING REEL WITH CLUTCH CONTROL MECHANISM

[75] Inventor: Shinichi Morimoto, Sakai, Japan
[73] Assignee: Shimano, Inc., Osaka, Japan
[21] Appl. No.: 949,352
[22] Filed: Sep. 23, 1992

Related U.S. Application Data

[63] Continuation of Ser. No. 640,832, Jan. 14, 1991, abandoned.

[30] Foreign Application Priority Data

Jan. 16, 1990 [JP] Japan ............................ 2-2919[U]

[51] Int. Cl.⁵ .............................................. A01K 89/015
[52] U.S. Cl. ............................................... 242/261
[58] Field of Search ........................ 242/259, 260, 261

[56] References Cited

U.S. PATENT DOCUMENTS

| 4,512,536 | 4/1985 | Sato | 242/261 |
|---|---|---|---|
| 4,674,699 | 6/1987 | Fukushima et al. | 242/261 |
| 4,798,355 | 1/1989 | Kaneko | 242/261 |
| 4,824,046 | 4/1989 | Emura et al. | 242/261 |
| 4,850,550 | 7/1989 | Aoki | 242/261 |
| 4,964,590 | 10/1990 | Sato | 242/261 |
| 5,163,635 | 11/1992 | Sato | 242/261 |

FOREIGN PATENT DOCUMENTS

60-36077  3/1985  Japan .

Primary Examiner—Katherine Matecki
Attorney, Agent, or Firm—Dickstein, Shapiro & Morin

[57] ABSTRACT

A fishing reel having a spool, a handle for taking up a line, a clutch mechanism pivotable about an axis for breaking force transmission between the handle and the spool thus rendering the spool freely rotatable and a clutch control member for actuating the clutch mechanism. The invention's reel further includes an intermediate member disposed between the clutch control member and a controlled portion of the clutch mechanism and a guide mechanism for guiding, in association with an operation of the clutch control member, the intermediate member along the axis or along an arcuate moving path centering about a further axis displaced from the first-mentioned axis or adjacent the arcuate moving path.

6 Claims, 4 Drawing Sheets

FISHING REEL WITH CLUTCH CONTROL MECHANISM

This application is a continuation of application Ser. No. 07/640,832 filed Jan. 14, 1991, now abandoned.

BACKGROUND OF THE INVENTION

1. Field of the Invention

The present invention relates to a fishing reel, and more particularly to a double-bearing type fishing reel having a clutch mechanism for temporarily breaking force transmission between a handle and a spool thus rendering the spool freely rotatable.

2. Description of the Related Art

A typical conventional fishing reel of the above-described type is known from Japanese laid-open utility model gazette No. 60-36077. This construction includes a clutch mechanism pivotably operated on the same axis as a spool shaft. For operating this clutch mechanism, pivot type two elements are disposed between a control member for actuating the clutch mechanism for force transmission intermission and a controlled portion of the clutch mechanism such that control forces associated with pivotal motions respectively of the two elements actuate the clutch mechanism.

According to the above convention where the clutch mechanism is actuated through the pivot type elements, it is relatively easy to freely set the operational stroke of the clutch control member at a desired range. On the other hand, the construction requires pivotal ranges of the pivot type elements, thus making it difficult to form the entire reel compact. In this respect, the convention has room for improvement.

The primary object of the present invention is to overcome the above drawback of the convention by providing an improved fishing reel which can be formed compact while the desired setting of the operational stroke of the clutch control member remains easy.

SUMMARY OF THE INVENTION

For accomplishing the above-described object, a fishing reel, according to the present invention, comprises: a spool; a handle for taking up a line; a clutch mechanism pivotable about an axis for breaking force transmission between the handle and the spool thus rendering the spool freely rotatable; a clutch control member for actuating the clutch mechanism; an intermediate member disposed between the clutch control member and a controlled portion of the clutch mechanism; and a guide mechanism for guiding, in association with an operation of the clutch control member, the intermediate member along the axis or along an arcuate moving path centering about a further axis displaced from the axis or adjacent the arcuate moving path.

Functions and effects of the above construction will now be described.

One embodiment of the above construction is shown in FIG. 1. With an operation of the clutch control member 6, the intermediate member 24 is moved along the arcuate moving path centering about an axis Q. Thus, compared with the convention using the pivot-type elements, the construction of the present invention does not require space reservation adjacent the intermediate member 24 for allowing pivotal strokes. Furthermore, by merely varying the position of the axis Q of the arcuate moving path, it is possible to freely vary and set the operational stroke of the clutch control member 6 for actuating the clutch mechanism C, without changing the relative position between this clutch control member 6 and the controlled portion 23a of the clutch mechanism C.

As described above, the invention has fully achieved the intended object of providing an improved fishing reel which can be formed compact while the desired setting of the operational stroke of the clutch control member remains easy.

Further and other objects, features and effects of the invention will become more apparent from the following more detailed description of the embodiments of the invention with reference to the accompanying drawings.

BRIEF DESCRIPTION OF THE DRAWINGS

Accompanying drawings illustrate preferred embodiments of a fishing reel relating to the present invention; in which.

DESCRIPTION OF THE PREFERRED EMBODIMENTS

Figure 1:
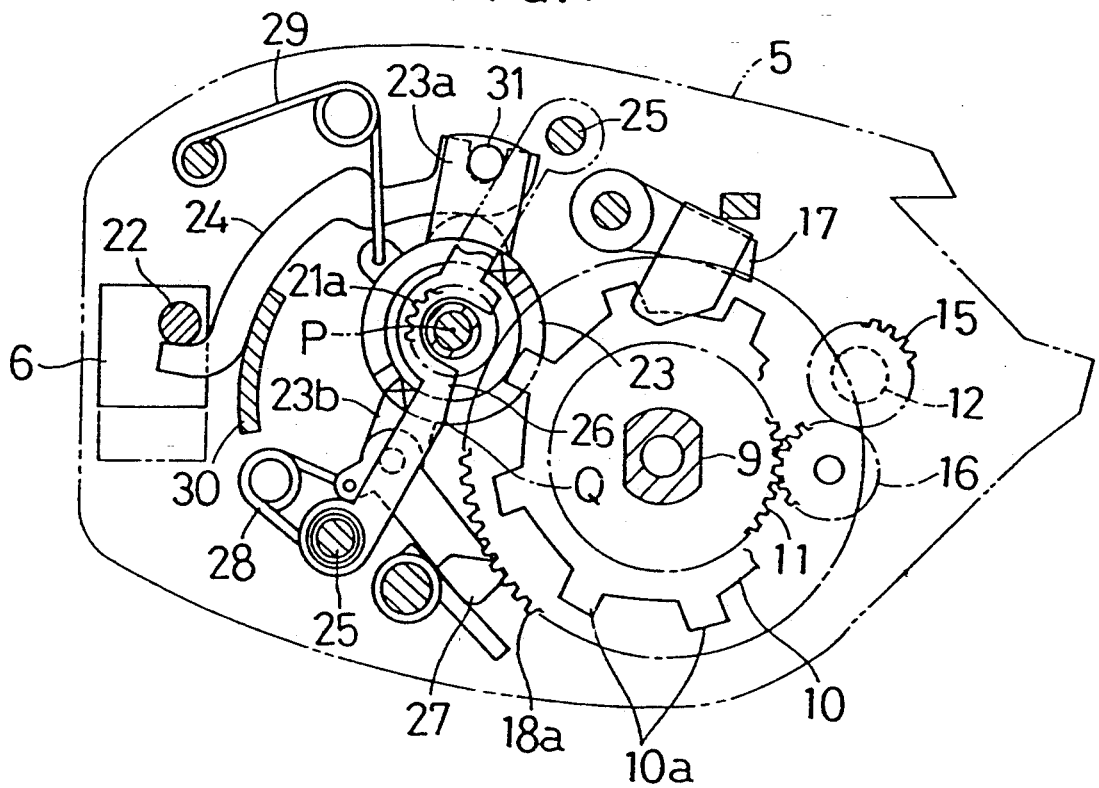
FIG. 1 is a section view showing a condition of the reel where its clutch mechanism is in a force transmission allowing condition.

Preferred embodiments of a fishing reel according to the invention will now be described in particular with reference to the accompanying drawings.

As shown in FIGS. 1 through 4, a fishing reel according to a first embodiment of the invention includes a level-wind mechanism A, a spool 2 and a thumb rest 3 disposed between a pair of right and left side cases 4, 5 in the mentioned order at forward, middle and rear positions, respectively, as the reel being attached to an unillustrated fishing rod. Rearwardly of the thumb rest 3, there is provided a push knob 6 as a clutch control member depressable for setting the spool 2 freely rotatable. On the outside of the right side case 5, there are provided a wind handle 7 and a star-shaped drag adjustment member 8.

Figure 3:
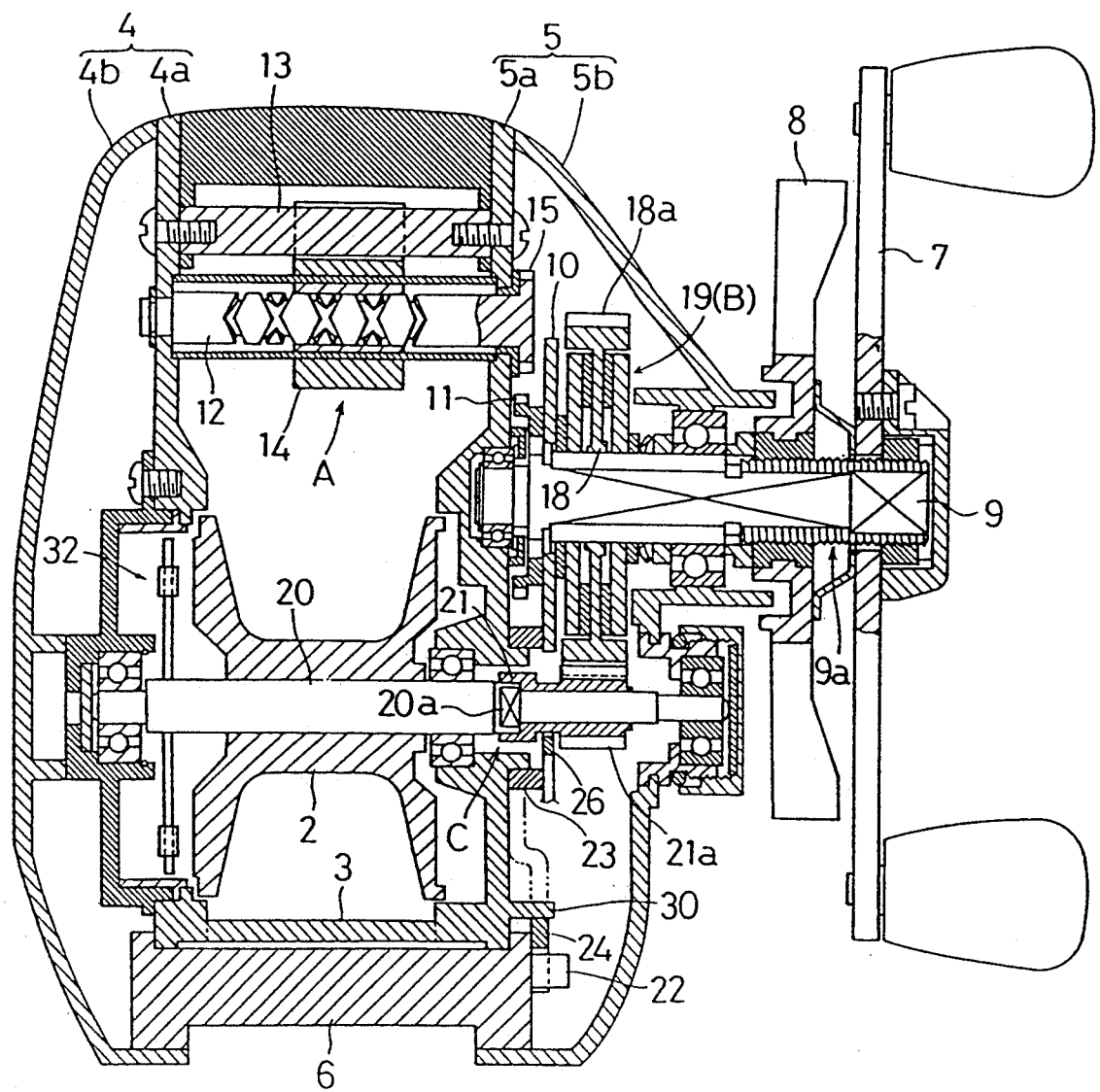
FIG. 3 is a plan view in section of the fishing reel.
Figure 4:
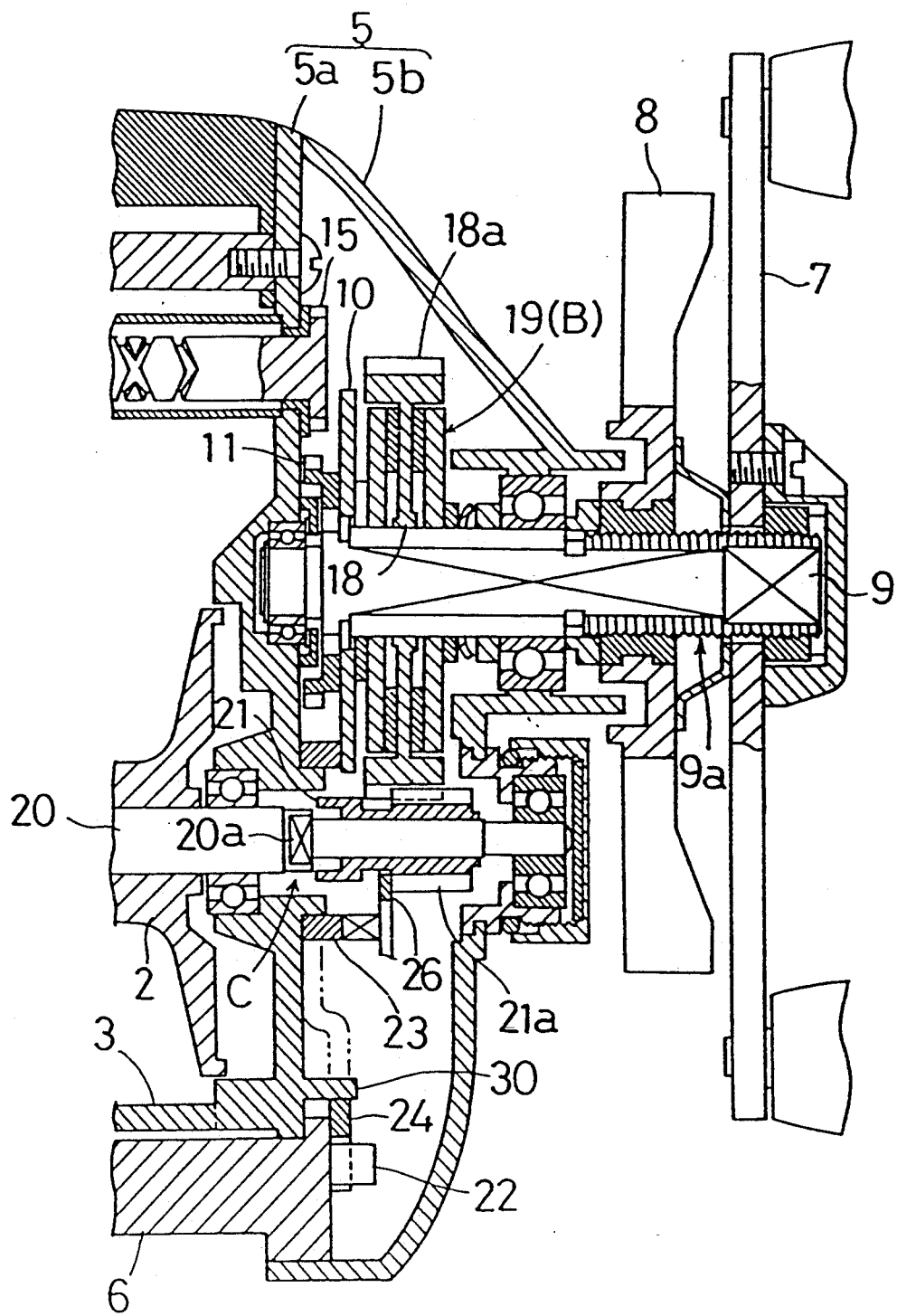
FIG. 4 is a partial section showing the condition where the clutch mechanism is in the force transmission breaking condition.

As best shown in FIG. 3, the side cases 4, 5 include side plates 4a, 5a and outer wall members 4b, 5b covering outer side faces of the side plates 4a, 5a, respectively. Through a gap between the right side plate 5a and the outer wall member 5b, there is inserted a rotary shaft 9 associated with the handle 7.

The aforementioned drag adjustment member 8 is screwed on a threaded portion 9a defined at an outer end of the rotary shaft 9. Whereas, the rotary shaft 9 mounts, on the side of an inner end thereof, a drag mechanism B, a ratchet wheel 10 and a transmission gear 11 for transmitting force to the level-wind mechanism A.

The level-wind mechanism A is so constructed as to reciprocate a line guide member 14 along a guide rod 13 in association with a rotary motion of a spiral shaft 12. The force from the aforementioned transmission gear 11 is transmitted via an intermediate gear 16 to a gear 15 fitted on an end of the spiral shaft 12.

The rachet wheel 10 includes, in its outer periphery, a plurality of radially projecting teeth 10a. Further, a claw member 17 is provided adjacent the rachet wheel 10, with the member 17 being normally urged for engagement with the teeth 10a. Thus, the ratchet wheel 10 functions to prevent a reverse rotation of the rotary shaft 9.

The rotary shaft 9 loosely mounts a free-rotation disc 18 carrying an output gear 18a at an outer periphery thereof. The drag mechanism B essentially comprises a pair of friction plates 19, 19 disposed across the free-rotation disc 18 and fitted on the rotary shaft 9 thereby to transmit torque to this shaft 9, such that adjustment of friction force is effected through adjustment of pressure contact, which in turn is effected by rotating the drag adjustment member 8.

A spool shaft 20 is provided for unisonal rotation with the spool 2. This spool shaft 20 defines, at an intermediate position thereof, an engaging portion 20a. Further, the spool shaft 20 loosely mounts a slide element 21 slidable for engagement with the engaging portion 20a. This slide element 21 carries an input gear 21a which meshes the output gear 18a of the free-rotation disc 18. Accordingly, when the handle 7 is rotated with the slide element 21 engaging the engaging portion 20a, the spool 2 is rotated for taking up the fishing line thereabout.

In the course of the above line take-up operation of the spool 2, the level-wind mechanism A functions to sidewise level the take-up amount of the spool 2; whereas, the ratchet wheel 10 functions to prevent reverse rotation of the handle 7.

The above-described slide element 21 and the engaging portion 20a together constitute a clutch mechanism C. Then, for casting the fishing line from the spool 2, first, the slide element 21 is set at a position shown in FIG. 4 for actuating the clutch mechanism C for temporarily breaking the force transmission thus rendering the spool 2 freely rotatable. Then, the fishing rod is swung to rotate the spool 2 by tension of the fishing line.

With the fishing reel of this particular embodiment, the above-described, free-rotation setting of the spool 2 is effected by pressing down the press knob 6.

More particularly, the press knob 6 is vertically movably supported between the right and left side plates 4a, 5a. And, at an end of this press knob 6, there is projected a pin 22. An intermediate member 24 is provided for linking the pin 22 with an arm 23a (an example of a controlled portion) of a ring-shaped cam 23 supported pivotable about the same axis as the axis of the spool shaft 20. On the other hand, the slide element 21 is engaged with a shifter 26 movable along a pair of shafts 25, 25 disposed in parallel with and also above and below the spool shaft 20, respectively. Further a pivot element 27 is pivotably supported to the arm portion 23b of the ring-shaped cam 23; and a toggle spring 28 is provided for switching over the pivot element 27 between a position engaging with the teeth 10a of the ratchet wheel 10 and a further position disengaged away from the teeth 10a. Moreover, another toggle spring 29 is provided for maintaining the clutch mechanism C either at the above-described engaging position or the disengaging position relative to the ring-shaped cam 23. Consequently, with a depressing operation of the press knob 6, the spool 2 is set freely rotatable.

Figure 2:
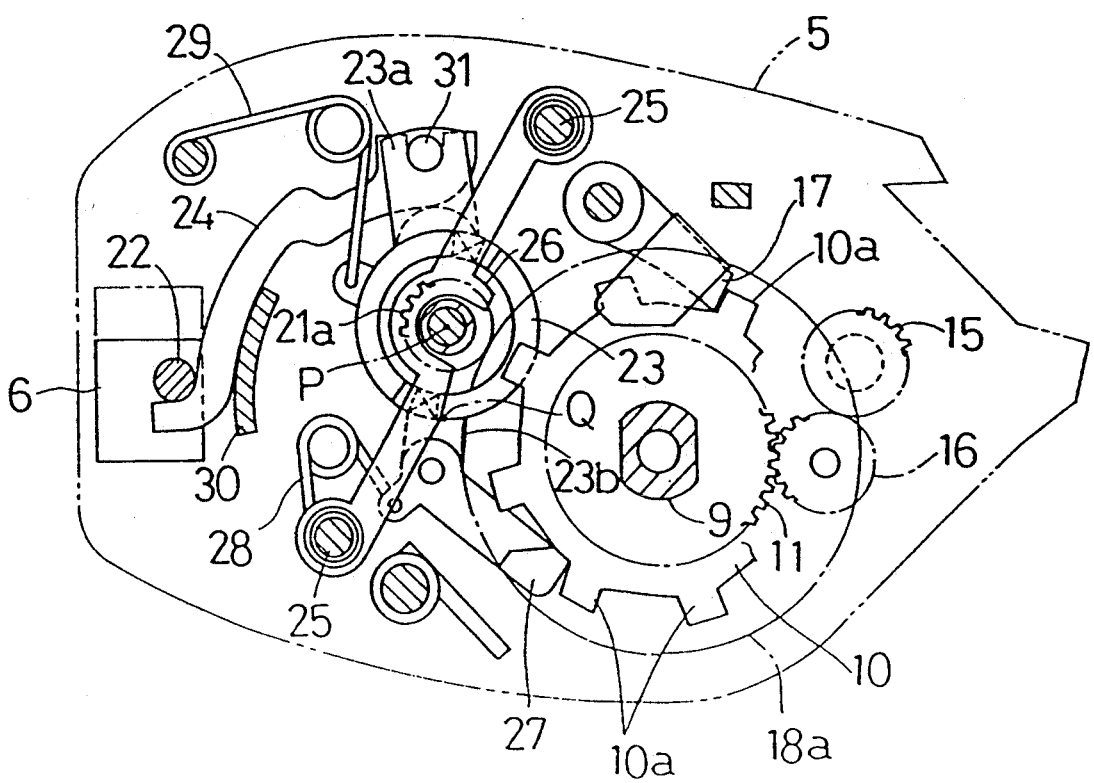
FIG. 2 is a section view showing a further condition of the same reel where the clutch mechanism is in a force transmission breaking condition.

The intermediate member 24, as shown in FIGS. 1 and 2, is formed arcuate and is placed in contact with an arcuate guide member 30 (an example of a guide mechanism) so that the member 24 is guided along an arcuate moving path about an axis Q displaced from the axis P of the spool shaft 20 when the press knob 6 is depressed. Then, as shown in the same figure, with the setting of the axis Q as the center of the arcuate guiding movement path, even a relatively small stroke of operation of the press knob 6 can actuate the clutch mechanism C for breaking the force transmission.

Incidentally, one distal end of the above-described intermediate member 24 is engaged with a pin 31 projecting from the arm 23a of the ring-shaped cam 23, while the other distal end of the intermediate member 24 is placed in abutment against the pin 22 projecting from the press knob 6.

With this reel in operation, when the handle 7 is rotated with the press knob 6 being set at the down stroke end, the pivot element 27 is returned by rotational force of the teeth 10a thus returning press knob 6 at its undepressed home position.

A reference numeral 32 in the drawings denotes a centrifugal force brake for preventing a backlash trouble of the spool associated with the line casting operation.

Some other embodiments of the invention will be specifically described next.

Figure 5:
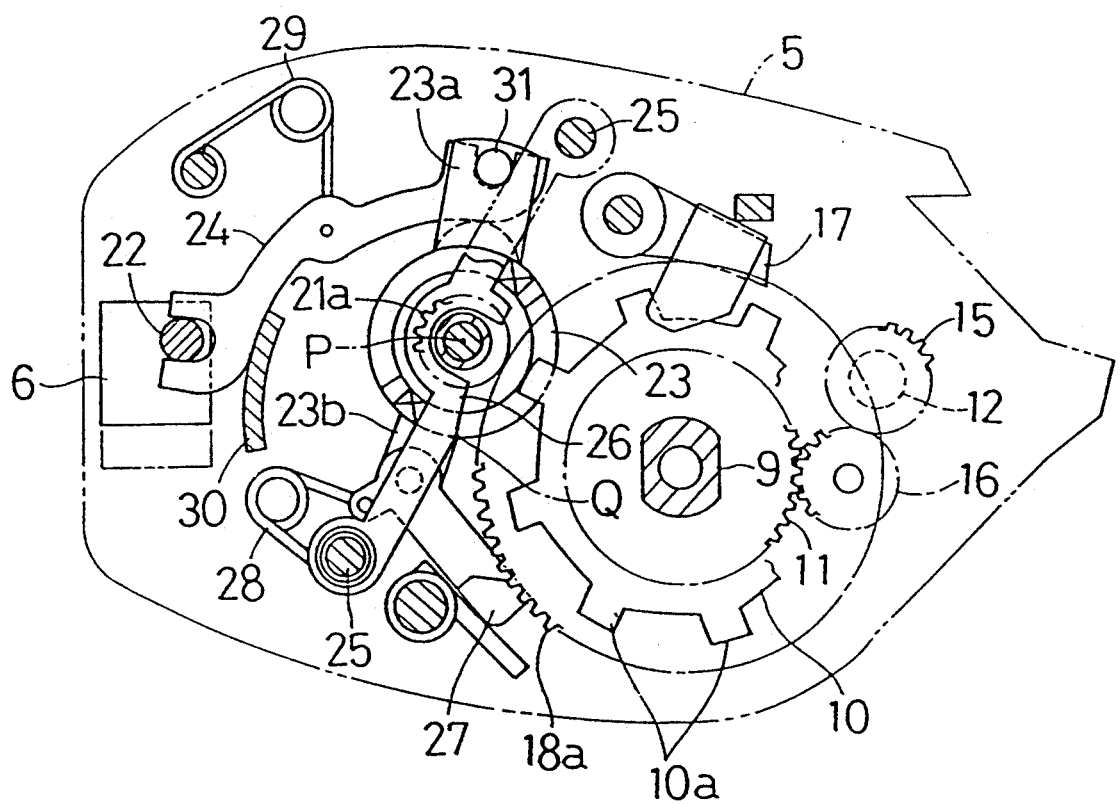
FIG. 5 is a section view showing a fishing reel according to another embodiment of the invention.

As shown in FIG. 5, it is conceivable to engage the intermediate member 24 and the pin 22 of the push knob 6 while the toggle spring 29 provides the urging force to this intermediate member 24.

The invention is applicable also to a fishing reel where the push knob 6 is not retained at the non-transmission position. Also, the center of the arcuate moving path may be freely set at any other position than that described in the foregoing embodiment.

The guide mechanism may comprise a plurality of free-rotation rollers arranged along an arc.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A bait-casting fishing reel comprising:
   a spool and a spool shaft, said spool being rotatable about said spool shaft;
   right and left cases;
   a handle for taking up a line;
   a transmission mechanism for transmitting rotation of the handle to said spool, said transmission mechanism including a rotary shaft, an output gear and a clutch mechanism;
   said clutch mechanism being pivotable about a first axis for breaking force transmission between said handle and said spool thus rendering the spool freely rotatable, said clutch mechanism including a radially projecting controlled portion;
   a clutch control member for actuating said clutch mechanism and having a first pin projecting from one end thereof adjacent to the handle;
   a ring-shaped cam supported to be pivotable about said spool shaft, said cam including said radially projecting controlled portion of said clutch mechanism, and wherein a second pin projects from said controlled portion;

an intermediate member disposed between said clutch control member and said controlled portion of said clutch mechanism, said intermediate member contacting said first pin and engaging said second pin;

a guide mechanism for guiding said intermediate member during operation of said clutch control member, said intermediate member being guided along a substantially arcuate moving path;

wherein said guide mechanism is located within said reel between said clutch control member and said spool shaft so as not to interfere with the movement of said clutch control member;

wherein said intermediate member is interposed between said clutch control member and said guide mechanism, said intermediate member having first and second sides, with said first side of said intermediate member being in contact with said clutch control member, and with said second side of said intermediate member being in contact with said guide mechanism; and said reel being arranged such that a push-down operation of said clutch control member causes said intermediate member to be pivoted along a contact surface of said guide mechanism, and causes said ring-shaped cam to be pivoted to thereby disengage said clutch mechanism.

2. A bait-casting fishing reel as defined in claim 1, wherein said clutch mechanism includes a slide element rotatably supported on said spool shaft and an engaging portion defined in said spool shaft and disengageably engageable with said slide element, said spool shaft being supported between said right and left cases.

3. A bait-casting fishing reel as defined in claim 1, wherein said intermediate member has an arcuate shape, and wherein said intermediate member is guided along said arcuate moving path by said guide mechanism when said clutch control member is operated.

4. A bait-casting fishing reel as defined in claim 3, wherein said intermediate member has one end thereof engaging with said first pin of said clutch control member.

5. A bait-casting fishing reel as defined in claim 1, further comprising a toggle spring, and wherein said intermediate member is urged in a pushing-up direction or in a pushing-down direction by said toggle spring, said spring having one end engaged with said ring-shaped cam and the other end engaged with one of said cases.

6. A bait-casting fishing reel comprising:

a spool and a spool shaft, said spool being rotatable about said spool shaft;

a handle for taking up a line;

a transmission mechanism for transmitting rotation of the handle to said spool, said transmission member including a rotary shaft, an output gear and a clutch mechanism;

said clutch mechanism being pivotable about a first axis (P) for breaking force transmission between said handle and said spool thus rendering the spool freely rotatable, said clutch control mechanism including a controlled portion;

a movable clutch control member (6, 22) for actuating said clutch mechanism;

an intermediate member (24) disposed between said clutch control member and said controlled portion of said clutch mechanism; and an arcuate guide mechanism (30) for guiding said intermediate member along an arcuate moving path during operation of said clutch control member, wherein said arcuate moving path centers about a second axis (Q), and wherein said second axis is displaced from said first axis;

wherein said guide mechanism is located within said reel between said clutch control member and said spool shaft so as not to interfere with the movement of said clutch control member; and wherein said intermediate member is interposed between said clutch control member and said guide mechanism, said intermediate member having first and second sides, with said first side of said intermediate member being in contact with said clutch control member, and with said second side of said 3ntermediate member being in contact with said guide mechanism.

* * * * *